US008121036B2

(12) United States Patent
Liu et al.

(10) Patent No.: US 8,121,036 B2
(45) Date of Patent: Feb. 21, 2012

(54) WIRELESS MESH NETWORK FOR INTER-COMPONENT DATA COMMUNICATIONS IN SATELLITE SYSTEMS

(75) Inventors: Haiyang Liu, Blaine, MN (US); Jamal Haque, Clearwater, FL (US); Andrzej Peczalski, Eden Prairie, MN (US)

(73) Assignee: Honeywell International, Inc., Morristown, NJ (US)

( * ) Notice: Subject to any disclaimer, the term of this patent is extended or adjusted under 35 U.S.C. 154(b) by 448 days.

(21) Appl. No.: 12/342,698

(22) Filed: Dec. 23, 2008

(65) Prior Publication Data

US 2010/0157801 A1 Jun. 24, 2010

(51) Int. Cl.
G08C 15/00 (2006.01)

(52) U.S. Cl. ........ 370/235; 370/230; 370/238; 370/248; 370/252; 370/255; 370/338; 370/400; 709/240

(58) Field of Classification Search .................. 370/235, 370/230, 238, 248, 252, 254, 255, 338, 351, 370/389, 400; 709/238–244
See application file for complete search history.

(56) References Cited

U.S. PATENT DOCUMENTS

| | | | |
|---|---|---|---|
| 5,150,378 A | 9/1992 | Mui | |
| 7,286,489 B2 | 10/2007 | Ades | |
| 7,420,952 B2 | 9/2008 | da Costa et al. | |
| 2005/0031047 A1 | 2/2005 | Maltsev et al. | |
| 2006/0206706 A1 | 9/2006 | Dietz | |
| 2007/0008927 A1 | 1/2007 | Herz et al. | |
| 2007/0286097 A1 | 12/2007 | Davies | |
| 2009/0135764 A1* | 5/2009 | In et al. .................. | 370/328 |

FOREIGN PATENT DOCUMENTS

| | | |
|---|---|---|
| EP | 1032142 | 8/2000 |
| WO | 2007022817 | 3/2007 |

OTHER PUBLICATIONS

"High Rate Ultra Wideband PHY and MAC Standard", "Standard ECMA-368", Dec. 2007, No. 2, Publisher: ECMA International, Published in: Geneva.
Liu et al., "PWave: Flexible Potential-based Routing Framework for Wireless Sensor Networks", "Technical Report", Aug. 7, 2006, Publisher: University of Minnesota Department of Computer Science and Engineering.

(Continued)

*Primary Examiner* — Luat Phung
(74) *Attorney, Agent, or Firm* — Fogg & Powers LLC

(57) ABSTRACT

A network system for inter-component communications in an electronic device is disclosed. The system comprises a plurality of components for an electronic device, where each of the components communicates with at least one other component over a communications medium for a wireless mesh network. Each of the components comprises a communications transceiver operable to determine network traffic load levels for an exchange of communication data between the components, and allocate the network traffic between at least one pair of the components over a plurality of wireless links within the wireless mesh network based on potential-field based measurements at each of the components. In addition, each of the communications transceivers share the exchange of the communication data between the components based on a prescribed priority level for allocation of the network traffic.

14 Claims, 5 Drawing Sheets

OTHER PUBLICATIONS

Pace et al, "An Adaptive and Responsive Transport Protocol for Wireless Mesh Networks", "Broadband and Wireless Networking Laboratory", Publisher: Georgia Institute of Technology, Published in: Atlanta, GA.

Setton et al., "Cross-layer Design of Ad Hoc Networks for Real-Time Video Streaming", "IEEE Wireless Communications Magazine", Aug. 2005, pp. 59-65, vol. 12, No. 4, Publisher: IEEE.

UK Intellectual Property Office, "Great Britain Search Report", Feb. 23, 2010, Published in: GB.

* cited by examiner

WIRELESS MESH NETWORK FOR INTER-COMPONENT DATA COMMUNICATIONS IN SATELLITE SYSTEMS

BACKGROUND

Presently, ever-expanding requirements on inter-component data gathering and processing demand more complex satellite systems. In addition, and with regards to satellite system hardware, electronic component densities and pin counts already approach levels where board designers are further challenged to avoid any electromagnetic interference due to dense electronic board layouts and signal routing. Moreover, incorporating a large number of these electronic components, along with stringent thermal management and suitable power distribution add more challenges in building a reliable satellite system for mission-critical space applications.

Current satellite system designs rely on variations of two fundamental inter-connection types: rigid direct interconnects and shared communication buses. The rigid direct interconnects, while providing high communication bandwidth with low latency, suffer exponentially growing complexity in system design and data routing. Conversely, a shared communication bus architecture, while significantly reducing system complexity, suffers from low data rates and large time delays.

Each of these inter-connection architectures have reduced levels of system-wide fault tolerance and re-configurability support. For example, the rigid direct interconnects require extensive mechanical verification during assembly of the satellite system, since these interconnects are subject to extreme levels of vibrations during testing and (eventual) launch of the system. There are concerns that these vibrations will disengage the interconnects, causing one or more communications faults within the system. Moreover, a single failure in a particular communication bus or direct interconnect will render a permanent functional loss of any affected components. In addition, there is also a growing need for parts of these satellite systems to split into one or more modules after launch. For example, it is preferable that this splitting does not involve cutting of any direct-wired or optical interconnects that are required to maintain communications within the system.

In each of these instances, human intervention is necessary to reconfigure the system, either to circumvent the failed components or to support new satellite missions. Thus, there is a need for improvements in inter-component data communications in satellite systems.

SUMMARY

The following specification provides for a wireless mesh network for inter-component data communications in satellite systems. Particularly, in one embodiment, a network system for inter-component data communications is provided. The system comprises a plurality of components for an electronic device, where each of the components communicates with at least one other component over a communications medium for a wireless mesh network. Each of the components comprises a communications transceiver operable to determine network traffic load levels for an exchange of communication data between the components, and allocate the network traffic between at least one pair of the components over a plurality of wireless links within the wireless mesh network based on potential-field based measurements at each of the components. In addition, each of the communications transceivers share the exchange of the communication data between the components based on a prescribed priority level for allocation of the network traffic.

BRIEF DESCRIPTION OF THE DRAWINGS

These and other features, aspects, and advantages are better understood with regard to the following description, appended claims, and accompanying drawings where:

The various described features are drawn to emphasize features relevant to the embodiments disclosed. Like reference characters denote like elements throughout the figures and text of the specification.

DETAILED DESCRIPTION

Embodiments disclosed herein relate to a wireless mesh network for inter-component data communications in satellite systems. In particular, the inter-component data communications discussed herein involves integration of one or more relatively low-power ultra wide band (UWB) communications transceivers, with high-speed arithmetic computing and storage capabilities, within a plurality of electronic components of an electronic system, including (without limitation) a satellite system.

In one embodiment, the wireless mesh network provides an inter-connection (data sharing) platform among the electronic components of the satellite system. The wireless mesh network is reconfigurable for data communications between the electronic components within the satellite system. In particular, the satellite system will use this network to provide a substantially higher data rate (over conventional wired systems) for data sharing between the electronic components. For example, the wireless mesh network comprises a particular framework for data communications having a relatively low system complexity that combines traffic-adaptive medium access control in a data link layer with potential-field based message routing in a network layer, as discussed in further detail below.

Further, the network and the communications framework discussed herein are suitable for use in the design and construction of various satellite modules and sub-systems. These satellite modules and sub-systems are constructed and tested with reduced weight (through a reduction in wiring and redundant element reduction) at a reduced cost, and with reduced power consumption (due to the reduction in elements). In addition, the wireless network discussed herein allows the use of radiation-tolerant commercial-off-the-shelf (COTS) components to further reduce the cost and design complexity of the satellite system.

As discussed in further detail below, the communications framework provides "self-organizing" and "self-healing" networking capabilities. Moreover, the communications framework allows for co-existence of mission-critical data flows (for example, satellite system control signals) and elastic data flows (for example, satellite image data) in the same satellite system.

Figure 1:
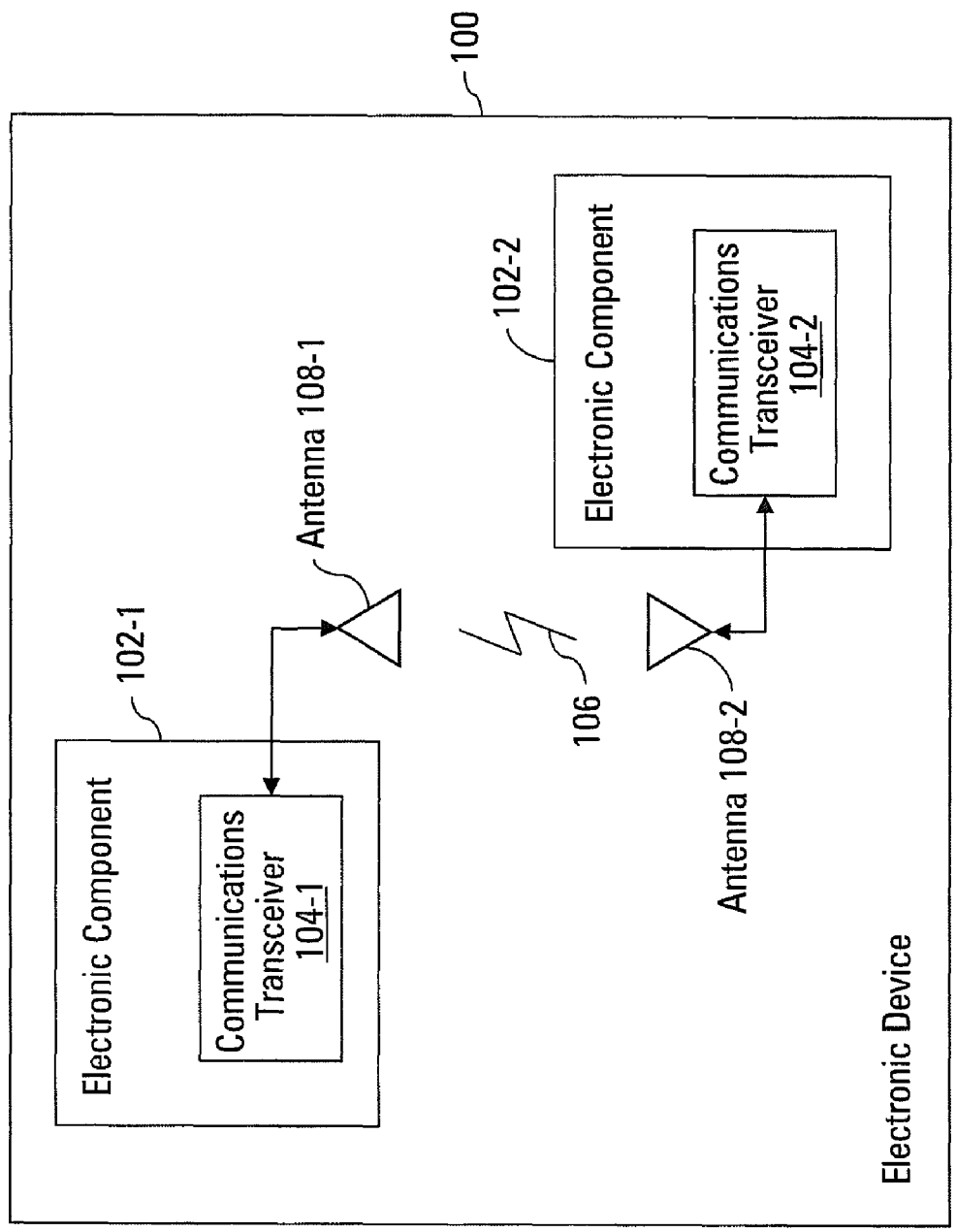
FIG. 1 is a block diagram of an embodiment of an electronic device.

FIG. 1 is a block diagram of an embodiment of an electronic device 100. The device 100 comprises electronic components 102-1 and 102-2 and antennas 108-1 and 108-2 communicatively coupled to each of the components 102-1 and 102-2, respectively. In addition, each of the components 102-1 and 102-2 further comprise communications transceivers 104-1 and 104-2, respectively. As shown in FIG. 1, the components 102-1 and 102-2 use the antennas 108 to communicate with one another over a wireless link 106. It is understood that the device 100 is capable of accommodating any appropriate number of the components 102 (for example, one or more of the components 102) in a single device 100.

In the example embodiment of FIG. 1, each of the components 102 are radiation-hardened components that comprise at least one of a microprocessor, a microcontroller, a field-programmable gate array (FPGA), a field-programmable object array (FPOA), a programmable logic device (PLD), or an application-specific integrated circuit (ASIC). The transceivers 104 of FIG. 1 are ultra wide band (UWB) transceivers, or a similar wireless communications protocol, capable of providing broad-spectrum, high-speed communications between the components 102.

In operation, each of the transceivers 104 transmit and receive data communications signals for the components 102 over the wireless link 106. In the example embodiment of FIG. 1, the transceivers 104 use the broad-spectrum, high-speed communications functionality provided by an enhanced UWB protocol (using the framework of FIG. 3 as discussed in further detail below) to provide inter-component data communications between the components 102.

In one implementation, a communications framework (discussed in further detail below with respect to FIG. 3) extends the capabilities of UWB to the network level as a form of narrow-band communication suitable for use between the transceivers 104. In this same implementation, a clear channel assessment capability is provided on each of the transceivers 104. For example, and as discussed in further detail below with respect to FIG. 3, implementation of a traffic-adaptive media access control (MAC) layer in a potential-field based routing framework provides the clear channel assessment capability with a prescribed Quality of Service (QoS) for the device 100.

Figure 2:
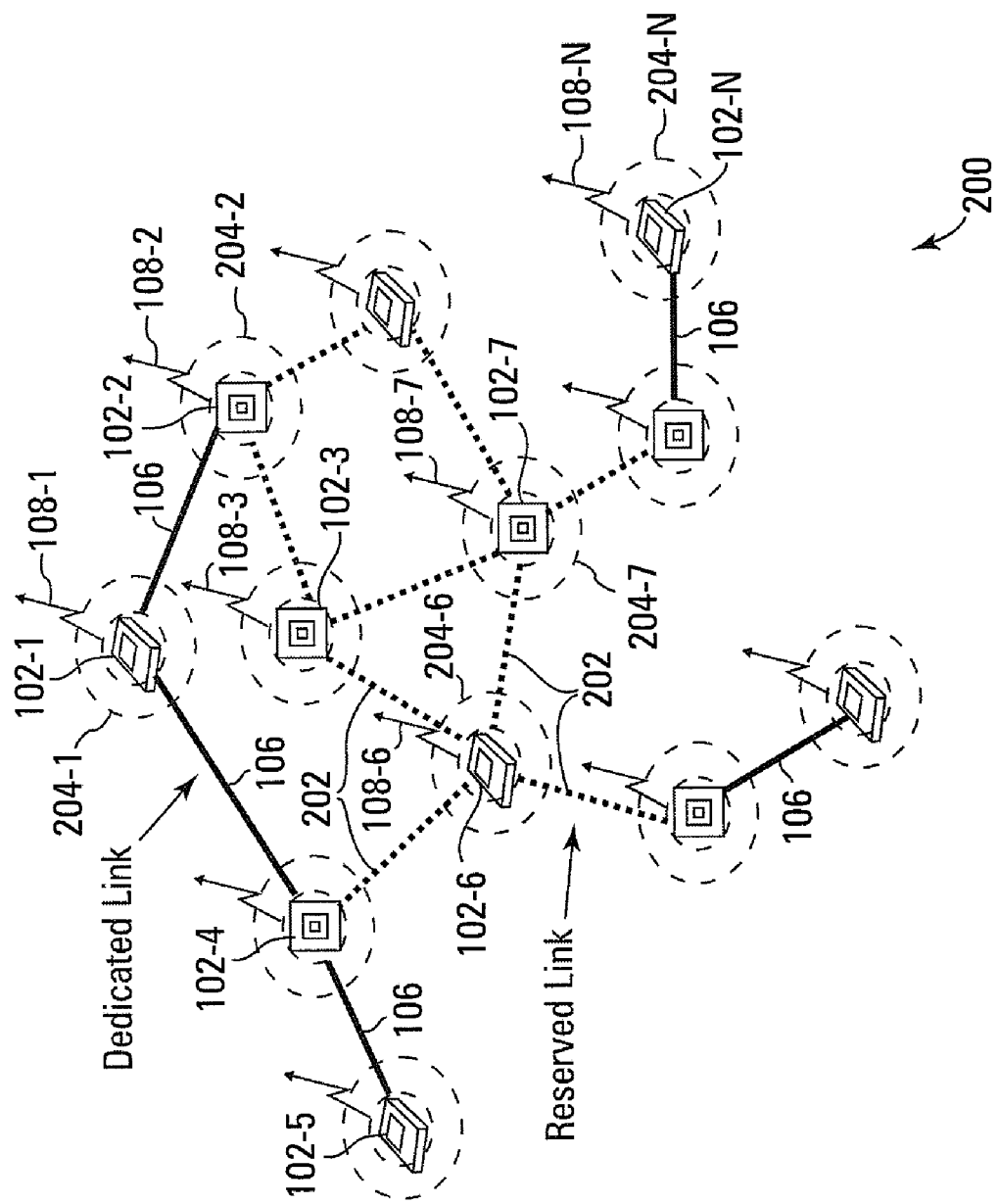
FIG. 2 is an illustration of an embodiment of a wireless mesh network for inter-component data communications in a satellite system.

FIG. 2 is an illustration of an embodiment of a wireless mesh network 200 for inter-component data communications. The network 200 includes each of the components 102 of FIG. 1 and is designed to be a self-organizing and self-healing network system without a central coordinator (for example, the network 200 does not require a dedicated base station or central node). As discussed in further detail below, the network 200 will provide significantly improved reliability and "on-the-fly" mission re-configurability capabilities for a satellite system.

FIG. 2 shows the state of the network 200 at a particular point in time. In one implementation, various components 102-1 to 102-N join and leave the network 200. The network 200 exhibits a communication pattern in which high-speed, near real-time data communications signals flow between the components 102-1 to 102-N over an ultra-wide band spectrum for wireless communications (for example, one or more wireless links 202 between UWB transmissions 204). For example, messages consisting of one or more packets of data are transmitted between all of the components 102-1 to 102-N. As shown in FIG. 2, such messages flow directly (that is, with a single hop) between the components 102-1 and 102-4 to the component 102-5. Continuing with this same example, another component 102-7 is outside of the transmission range of the component 102-1. Therefore, communication between the component 102-7 and the component 102-1 is routed through the component 102-3. The component 102-3 is within a transmission range of the component 102-1. The component 102-3 routes such transmissions received from the component 102-1 onto the component 102-7 and routes transmissions received from the component 102-7 onto the component 102-1. In other words, such transmissions are considered a multi-hop transmission.

One particular configuration of the components 102 is shown in FIG. 2. It is to be understood that in other embodiments there will be different arrangements of the electronic components, and that transmissions between the electronic components are expected to include one or more hops.

In one embodiment, the communication range of each of the wireless links 202 and the UWB transmissions 204 is designed for low link-level bit error rate, high data rate, and low power consumption between the components 102. This particular communication range will enable bandwidth reuse of any shared spectrums within the UWB inter-component network of FIG. 2 for improved overall communication capacity between the components 102. Moreover, the availability of multiple communication paths is also leveraged to provide a high aggregated data rate between a first (that is, a source) component 102 and a second (destination) component 102.

The network shown in FIG. 2 takes advantage of UWB transceivers, which have a relatively simple transceiver design, low power consumption and a high data rate over short distances (for example, between the electronic components in the satellite system). The network 200 provides system-wide data sharing among data collection, data processing, data storage, and long haul data communication components, such as the components 102-1 to 102-N shown in FIG. 2. In addition, the wireless mesh structure of the network 200 provides a suitable balance between high speed and system complexity. The number of wireless links 202 in the mesh structure is designed to grow linearly with the number of components. As shown in FIG. 2, a first portion of the wireless links 202 are considered "dedicated" links (indicated by the solid interconnect line between the components 102). A second portion of the wireless links 202 are considered "reserved" links (indicated by the dashed interconnect line between the components 102) for changes in the configuration between the components 102. Thus, the system design of the network 200 is relatively more scalable to a significant number of the components 102, compared to any additional configurations desired in a direct connection (that is, a hard-wired) system design.

In operation, each of the communications transceivers 104 determines network traffic load levels within the network 200 for an exchange of communication data between the components 102. As discussed in further detail below with respect to FIG. 3, each of the communications transceivers 104 allocate the network traffic between the components 102 over the wireless links 202 based on potential-field based measurements at each of the components 102. In addition, each of the communications transceivers 104 interpret the network traffic allocation to share the exchange of the communication data between the components 102 based on a prescribed priority level. For example, each of the components 102 are capable of transmitting and receiving communication data along one of the dedicated or reserved wireless links discussed above based on the potential-field based measurements corresponding to communication data transfer rates between the components 102 adjacent to one another.

Figure 3:
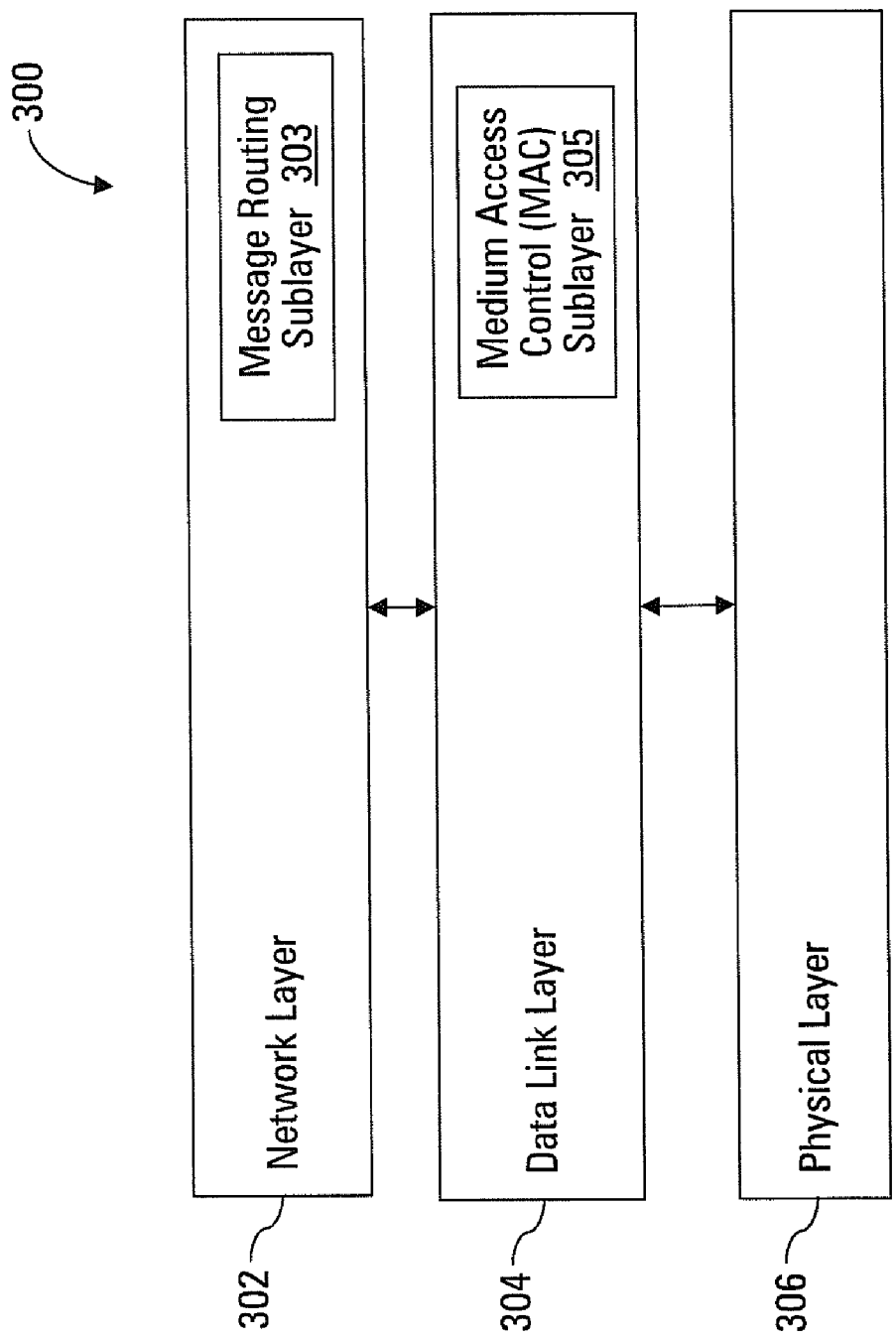
FIG. 3 is a block diagram of an embodiment of an application framework of a wireless mesh network for inter-component data communications in a satellite system.

FIG. 3 is a block diagram of an embodiment of an application framework, indicated generally at 300, operating on a wireless mesh network for inter-component data communications in a satellite system. In one embodiment, the framework 300 comprises multiple layers, as discussed below, which provide hardware-related services to enable the communications transceivers 104 to function as discussed above with respect to FIGS. 1 and 2. As shown in FIG. 3, the framework 300 comprises a network layer 302, a data link layer 304, and a physical layer 306. Each of these layers 302, 304, and 306 compartmentalize key functions required for any component 102 of the network 200 to communicate with any other component 102 of the network 200.

The physical layer 306 is communicatively coupled to, and provides low level functional support to, the data link layer 304 and the network layer 302. In one implementation, the physical layer 306 resides on an UWB wireless network for inter-component communications within the network 200. In addition, the physical layer 306 is responsive to one or more communication data exchange operations within the network 200. For example, the physical layer 306 provides electronic hardware support for sending and receiving communications data signals in a plurality of the data exchange operations from the transceivers 104. In the example embodiment of FIG. 3, at least one form of non-coherent transmitted reference (NTR) symbol modulation/demodulation is used to transmit and receive the communications data. The form of NTR contemplated for use herein remains operational even when time synchronization and channel estimations are not available. The physical layer 302 further reserves a time slot through a pseudo-carrier reference signal in one or more symbol transmissions provided by this particular NTR signal transfer technique.

The data link layer 304 provides error handling for the physical layer 306, along with flow control and frame synchronization for the physical layer 306. In one embodiment, the data link layer 304 further includes a medium access control (MAC) sub-layer 305. The MAC sub-layer 305 is concerned with (1) recognizing where one or more frames begin and end when receiving one or more data packets from the physical layer 306, (2) delimiting the one or more frames when sending the one or more data packets from the physical layer 306 so that one or more of the transceivers 104 are able to determine the size of the one or more data packets, (3) inserting transmitter and receiver node IDs into each of one or more transmitted data packets, (4) filtering out one or more packets intended for a particular transceiver 104 by verifying the destination address in one or more received data packets, and (5) control of access within the wireless mesh network of FIG. 2, (that is, which of one or more of the transceivers 104 have a right to transmit at a particular time). It is understood that any particular data packet structure is suitable for use with the physical layer 306 and the data link layer 304 (for example, a UWB data packet structure, or the like).

To achieve near simultaneous multiple communication sessions, with high data rates at a potentially high duty cycle, a control signal-free distributed MAC scheme is used in the framework 300. For example, the MAC sub-layer 305 approximates time division multiple access (TDMA) for periods of communication data signal traffic above a predetermined threshold for network traffic load levels at each of the communications transceivers 104, and approximates carrier sensing multiple access (CSMA) for periods of communication data signal traffic below this threshold. In the example embodiment of FIG. 3, a time slot is reserved through a "pseudo-carrier" reference signal within the NTR signal transmissions of the physical layer 306. In addition, this time slot reservation is prioritized in such a way that at any particular time slot, the "leader" transceiver 104 of that particular time slot has the highest priority for a period larger than what is required to detect the "pseudo-carrier" signal. In one implementation, the prioritization (for example, a "leader election") among multiple components 102 is achieved by pseudo-random number generation with a pre-assigned seed number (for example, the node ID of each of the components 102 can be used for this purpose). In addition, a differentiated Quality of Service (QoS) is provided between the components 102 by assigning at least a portion of the components 102 as components that will maintain operation of the satellite system (for example, assigning these components a larger weighting factor, and thus a proportionally increased chance to win a slot in the communications spectrum, as discussed in further detail below).

The network layer 302 is responsive to one or more operations of the data link layer 304 and the physical layer 306 on at least one programmable processor within the network 100 (for example, at least one of the communications transceivers 104). The network layer 302 provides switching and routing capabilities within the network 200 for transmitting the data communications signals between each of the components 102. In one embodiment, the network layer 302 further includes a message routing sub-layer 303. The message routing sub-layer 303 provides at least one form of potential-field based distributive load balancing for signal transmissions over the network 200, as discussed in further detail below.

Potential-Field Based Load Balancing and Routing

The message routing sub-layer 303 incorporates the use of potential-field based routing to provide the self-organizing and self-healing capabilities discussed above with respect to FIGS. 1 and 2. For example, in the network 200, a potential field is constructed out of the component interconnect mesh by emulating an analogous electric network. Potential values in the mesh are analogous to the voltage values, and network traffic load levels are analogous to the electric current flows. In the example embodiment of FIGS. 2 and 3, this potential field is provided in a wireless mesh network in a completely distributed fashion without the need of any central coordinator. Moreover, the message routing sub-layer 303 provides inter-communication capability among any of the components 102 for full re-configurability of the network 200. For example, any addition or deletion of the components 102 in the network 200 will trigger immediate flow redistributions instead of system failures or functional losses. Further details regarding potential-field based load balancing and routing are found in an article by H. Liu, Z. Zhang, J. Srivastava, V. Firoiu, and B. Decleene, "PWave: Flexible Potential-based Routing Framework for Wireless Sensor Networks," *Technical Report TR* 06-026, *Department of Computer Science and Engineering, University of Minnesota:* pp. 1-12 (Aug. 7, 2006), which is incorporated herein by reference.

In the network layer 302, a differentiated QoS is achieved by assigning different weights (analogous to resistances) in the message routing sub-layer 303 on mission critical links to allocate the network traffic load levels between one or more of the components 102. In this manner, each of the components 102 performs this traffic allocation to share the exchange of information and reduce any communication delays.

In one embodiment, any of the components 102 with a significantly longer delay that the majority of the components 102 will not participate in a current data communication, however these non-participating components will still exchange control messages for computation of potential value, and in at least one implementation, these same components are available for use in a future configuration of the network 200.

The network traffic allocation discussed herein is implemented in a distributed fashion with the (potential-field based) message routing sub-layer 303 of the framework 300, where each of the components 102 are capable of transmitting and receiving communication data within the network 200 based on the potential-field-based measurements corresponding to communication data transfer rates between the components 102 adjacent to one another.

Figure 4:
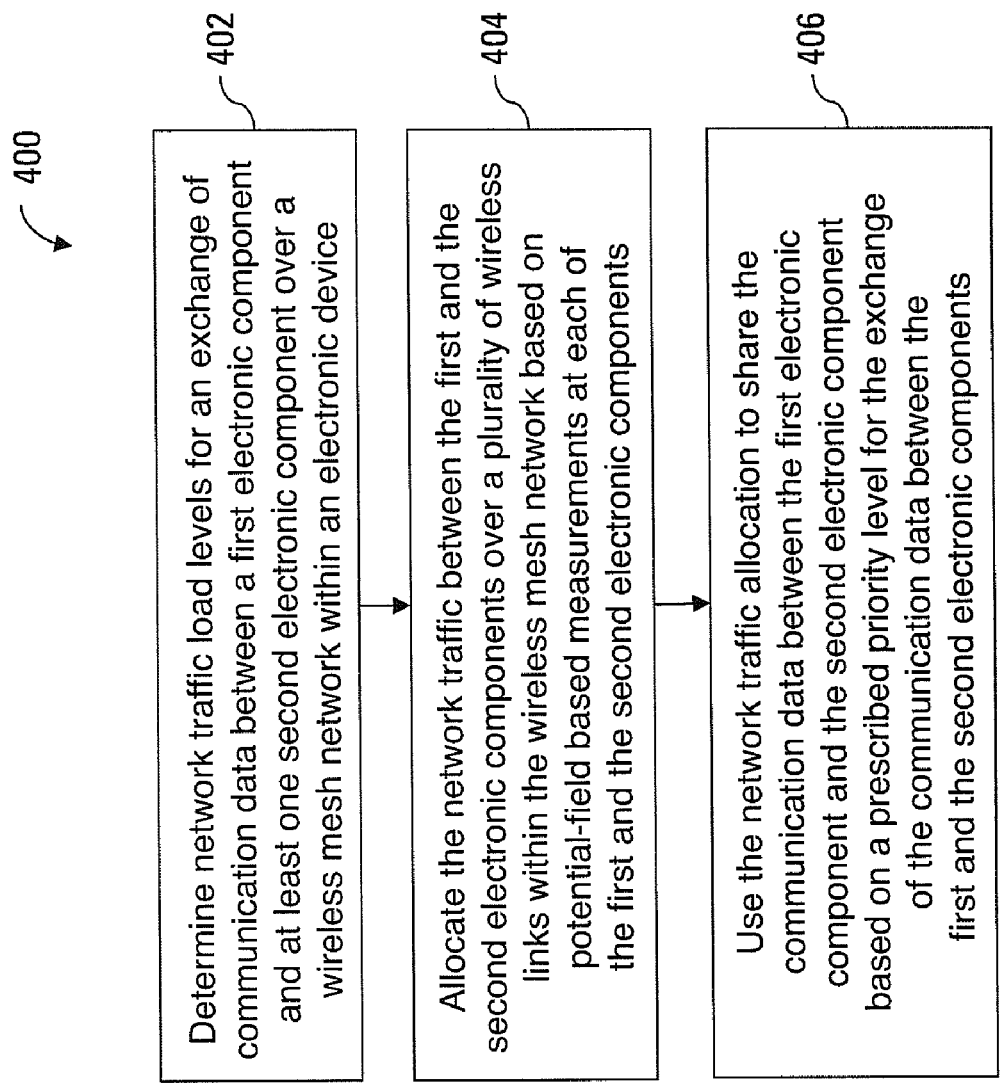
FIG. 4 is a flow diagram of an embodiment of a method for communicating between components of an electronic device.

FIG. 4 is a flow diagram of an embodiment of a method 400 for communicating between components of an electronic device. In one embodiment, the method 400 addresses routing of communication data between each of the electronic components within the device using a particular wireless mesh network that supports a differentiated QoS.

The method 400 determines network traffic load levels for an exchange of communication data between a first electronic component and at least one second electronic component over a wireless mesh network within the electronic device (block 402). The method 400 further allocates the network traffic between the first and the second electronic components over a plurality of wireless links within the wireless mesh network based on potential-field based measurements at each of the first and the second electronic components (block 404). In one implementation, the method 400 determines potential field values corresponding to communication data transfer rates between each of the electronic components adjacent to one another and constructs a potential field representative of each of the component interconnect edges in the wireless mesh network by emulating an analogous electrical network. For example, potential field values in the mesh network are analogous to voltage values in the electrical network and the network traffic load levels are analogous to current flows in the electrical network.

In one embodiment, the method 400 distributively balances the network traffic as signal transmissions over the plurality of wireless links based on the potential-field based measurements determined at each of the first and the second components. In one implementation, distributively balancing the network traffic involves redistributing the network traffic flow along at least one of the wireless links based on any changes in the number of electronic components within the wireless mesh network.

The method 400 uses the network traffic allocation to transfer the communication data as one or more data packets between the first electronic component and the second electronic component based on a prescribed priority level for the exchange of the communication data between the first and the second electronic components (block 406). In one implementation, to support the differentiated QoS discussed above, the method 400 assigns different weighting factors for at least a portion of the wireless links to maintain communication data flows within the electronic device, where the different weight assignments are analogous to resistance levels of the electrical network as observed by the network traffic between the electronic components.

Figure 5:
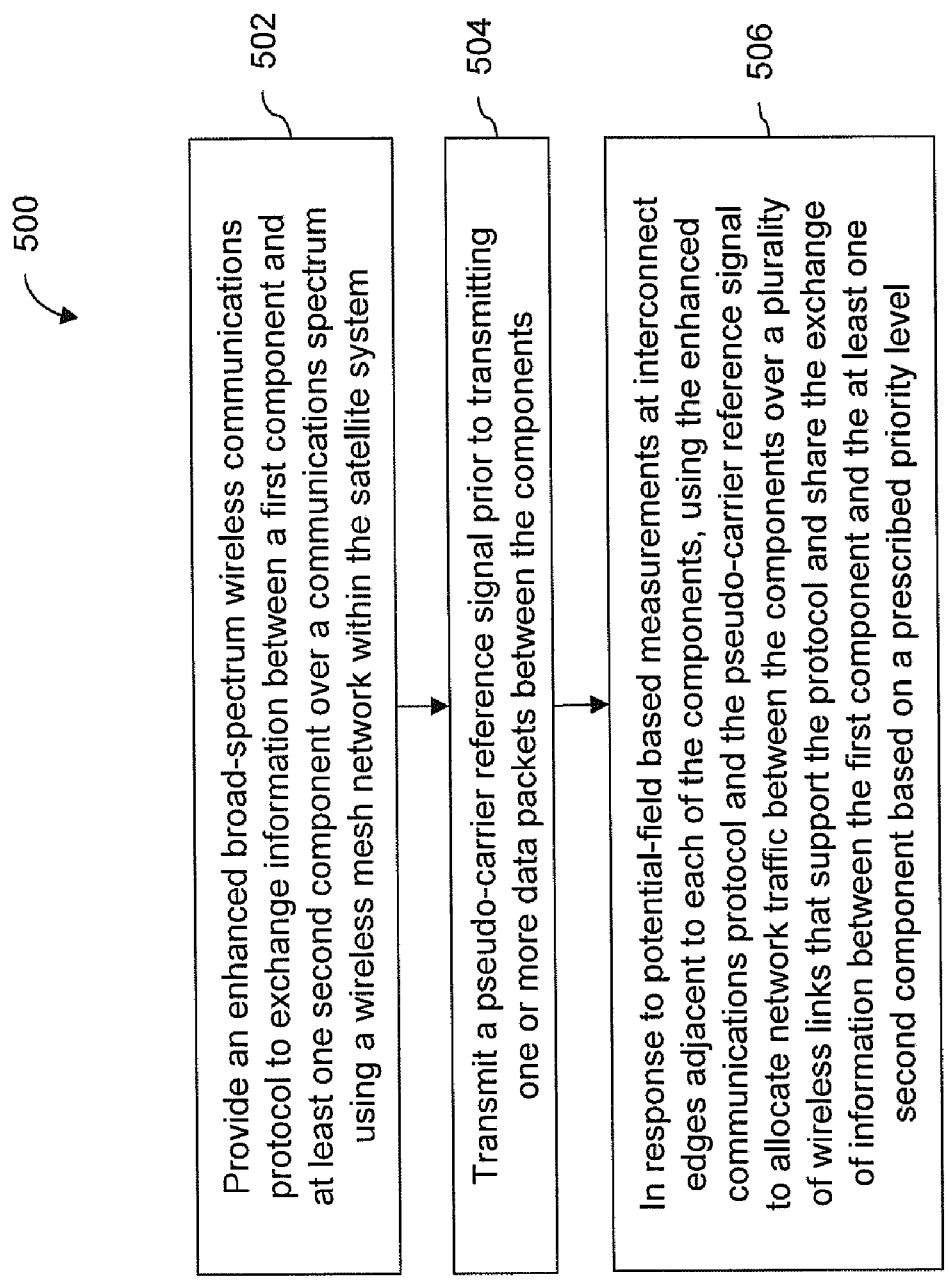
FIG. 5 is a flow diagram of an embodiment of a method for inter-component data communications within a satellite system.

FIG. 5 is a flow diagram of an embodiment of a method 500 for inter-component data communications within a satellite system. The method 500 addresses at least one form of traffic-adaptive medium access control that supports a differentiated QoS for wireless communications. The method of FIG. 5 provides an enhanced broad-spectrum wireless communications protocol to exchange information between a first component and at least one second component over a communications spectrum using a wireless mesh network within the satellite system (block 502). In one embodiment, the broad-spectrum wireless communications protocol approximates TDMA for periods of the network traffic above a predetermined load tolerance threshold for inter-component data communications between the components, and approximates CSMA for periods of network traffic below the predetermined load tolerance threshold.

The method 500 further involves transmitting a pseudo-carrier reference signal prior to transmitting one or more data packets between the components (block 504). In response to potential-field based measurements at interconnect edges adjacent to each of the components, the method 500 uses the enhanced communications protocol and the pseudo-carrier reference signal to allocate network traffic between the components over a plurality of wireless links that support the protocol and share the exchange of information between the first component and the at least one second component based on a prescribed priority level for inter-component data communications (block 506).

In one embodiment, transmitting the pseudo-carrier reference signal involves reserving a time slot through the pseudo-carrier reference signal in one or more symbol transmissions over at least one transmission hop, where the one or more symbol transmissions are provided by a non-coherent transmitted reference signal transfer technique within the enhanced communications protocol.

In one implementation, to support the differentiated QoS discussed above, the method of FIG. 5 uses the enhanced communications protocol and the pseudo-carrier reference signal for sharing the information exchange by assigning one or more of the components within the system a higher weighting factor and a proportionally higher chance to secure a time slot in the communications spectrum for the exchange of information from the first component to the at least one second component. For example, at any particular time slot, the first component will have the highest priority to complete the information exchange with the at least one second component for a period larger than what is required to detect the pseudo-carrier reference signal.

The methods and techniques described herein may be implemented in a combination of digital electronic circuitry and can be realized by hardware, executable modules stored on a computer readable medium, or a combination of both. An apparatus embodying these techniques may include appropriate input and output devices, a programmable processor, and a storage medium tangibly embodying program instructions for execution by the programmable processor. A process embodying these techniques may be performed by the programmable processor executing a program of instructions that operates on input data and generates appropriate output data. The techniques may be implemented in one or more programs that are executable on a programmable system including at least one programmable processor coupled to receive data and instructions from (and to transmit data and instructions to) a data storage system, at least one input device, and at least one output device. Generally, the processor will receive instructions and data from at least one of a read only memory (ROM) and a random access memory (RAM). In addition, storage media suitable for tangibly embodying computer program instructions and data include all forms of non-volatile memory, and include by way of example, semiconductor memory devices; magnetic disks such as internal hard disks and removable disks; magneto-optical discs; optical discs, and other computer-readable media. Any of the foregoing may be supplemented by, or incorporated in, specially-designed application-specific integrated circuits (ASICs).

When information is transferred or provided over a network or another communications connection (either hardwired, wireless, or a combination of hardwired or wireless) to a computer, a computer properly views the connection as a computer-readable medium. Thus, any such connection is properly termed a computer-readable medium. Combinations of the above are also included within the scope of computer-readable media.

This description has been presented for purposes of illustration, and is not intended to be exhaustive or limited to the embodiments disclosed. Variations and modifications may occur, which fall within the scope of the following claims.

What is claimed is:

1. A network system for inter-component data communications, the system comprising:
a plurality of components for an electronic device, wherein each of the components communicates with at least one other component over a communications medium for a wireless mesh network; and
a communications transceiver within each of the components, each of the communications transceivers operable to:
determine network traffic load levels for an exchange of communication data between the components; and
allocate the network traffic between at least one pair of the components over a plurality of wireless links within the wireless mesh network based on potential-field based measurements at each of the components;
wherein each of the communications transceivers share the exchange of the communication data between the components based on a prescribed priority level for allocation of the network traffic;
wherein each of the communications transceivers comprise an application framework for inter-component communications using a wireless mesh network, the framework comprising:
a physical layer responsive to one or more communication data exchange operations between the components over the communications medium; and
a data link layer responsive to one or more operations from the physical layer, the data link layer further comprising a media access control sub-layer configured to:
approximate time division multiple access for periods of communication data signal traffic above a predetermined threshold for the network traffic load levels at each of the communications transceivers; and
approximate carrier sensing multiple access for periods of communication data signal traffic below the predetermined threshold for the network traffic load levels at each of the communications transceivers.

2. The system of claim 1, wherein each component is capable of transmitting and receiving the communication data along a plurality of wireless links, without the need for a central coordinator, based on the potential field-based measurements corresponding to communication data transfer rates between the components adjacent to one another.

3. The system of claim 1, wherein each of the communications transceivers are further operable to:
transmit a pseudo-carrier reference signal prior to transmitting one or more packets of the communication data between the components; and
complete the exchange of the communication data over at least one transmission hop between the components based on the prescribed priority level using the communications medium and the pseudo-carrier reference signal.

4. The system of claim 3, wherein the framework further comprises:
a network layer responsive to one or more operations of the data link layer and the physical layer, the network layer further comprising a message routing sub-layer.

5. The system of claim 4, wherein the physical layer is configured to reserve a time slot through the pseudo-carrier reference signal in one or more symbol transmissions provided by a non-coherent transmitted reference signal transfer technique.

6. The system of claim 4, wherein the message routing sub-layer of the network layer is configured to provide at least one form of potential-based load balancing of the components for signal transmission by emulating an analogous electric network.

7. The system of claim 6, wherein potential values in the wireless mesh network are analogous to voltage values in the analogous electric network and the network traffic load levels are analogous to current flows in the analogous electric network.

8. The system of claim 1, wherein the communications medium is an ultra wide band wireless mesh network within a satellite system.

9. A method for inter-component data communications within a satellite system, the method comprising:
providing an enhanced broad-spectrum wireless communications protocol to exchange information between a first component and at least one second component over a communications spectrum using a wireless mesh network within the satellite system, wherein providing the enhanced broad-spectrum wireless communications protocol comprises:
approximating time division multiple access for periods of the network traffic above a predetermined load tolerance threshold for inter-component data communications between the components; and
approximating carrier sensing multiple access for periods of network traffic below the predetermined load tolerance threshold;
transmitting a pseudo-carrier reference signal prior to transmitting one or more data packets between the components; and
in response to potential field-based measurements at interconnect edges adjacent to each of the components, using the enhanced communications protocol and the pseudo-carrier reference signal for:
allocating network traffic between the components over a plurality of wireless links that support the enhanced communications protocol; and
sharing the exchange of information between the first component and the at least one second component based on a prescribed priority level for inter-component data communications.

10. The method of claim 9, wherein transmitting the pseudo-carrier reference signal further comprises:
reserving a time slot through the pseudo-carrier reference signal in one or more symbol transmissions over at least one transmission hop, the one or more symbol transmissions provided by a non-coherent transmitted reference signal transfer technique within the enhanced communications protocol.

11. The method of claim 9, wherein using the enhanced communications protocol and the pseudo-carrier reference signal for sharing the information exchange further comprises:

assigning one or more of the components within the system a higher weighting factor and a proportionally higher chance to secure a time slot in the communications spectrum for the exchange of information from the first component to the at least one second component;

wherein, at any particular time slot, the first component has the highest priority to complete the exchange of information with the at least one second component for a period larger than what is required to detect the pseudo-carrier reference signal.

12. A computer program product comprising:

a non-transitory computer-readable storage medium having executable instructions for implementing the method for inter-component data communications within a satellite system according to claim 9.

13. A method for inter-component data communications within a satellite system, the method comprising:

providing an enhanced broad-spectrum wireless communications protocol to exchange information between a first component and at least one second component over a communications spectrum using a wireless mesh network within the satellite system;

transmitting a pseudo-carrier reference signal prior to transmitting one or more data packets between the components; and in response to potential field-based measurements at interconnect edges adjacent to each of the components, using the enhanced communications protocol and the pseudo-carrier reference signal for:

allocating network traffic between the components over a plurality of wireless links that support the enhanced communications protocol; and sharing the exchange of information between the first component and the at least one second component based on a prescribed priority level for inter-component data communications;

wherein using the enhanced communications protocol and the pseudo-carrier reference signal for sharing the exchange of information further comprises:

assigning one or more of the components within the system a higher weighting factor and a proportionally higher chance to secure a time slot in the communications spectrum for the exchange of information from the first component to the at least one second component;

wherein, at any particular time slot, the first component has the highest priority to complete the exchange of information with the at least one second component for a period larger than what is required to detect the pseudo-carrier reference signal.

14. A computer program product comprising:

a non-transitory computer-readable storage medium having executable instructions for implementing the method for inter-component data communications within a satellite system according to claim 13.

\* \* \* \* \*